(12) United States Patent
Rosen et al.

(10) Patent No.: US 10,190,372 B2
(45) Date of Patent: Jan. 29, 2019

(54) ENERGY TRANSMISSION EFFICIENT DRILL STRING COUPLING

(71) Applicant: SANDVIK INTELLECTUAL PROPERTY AB, Sandviken (SE)

(72) Inventors: Jonas Rosen, Sandviken (SE); Tomas Sh Jansson, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/916,774

(22) PCT Filed: Aug. 25, 2014

(86) PCT No.: PCT/EP2014/067979
§ 371 (c)(1),
(2) Date: Mar. 4, 2016

(87) PCT Pub. No.: WO2015/032642
PCT Pub. Date: Mar. 12, 2015

(65) Prior Publication Data
US 2016/0222737 A1    Aug. 4, 2016

(30) Foreign Application Priority Data

Sep. 9, 2013   (EP) .................................... 13183533

(51) Int. Cl.
 *F16L 15/00*  (2006.01)
 *E21B 17/042*  (2006.01)
 *F16D 1/02*  (2006.01)

(52) U.S. Cl.
CPC ........ *E21B 17/042* (2013.01); *E21B 17/0426* (2013.01); *F16D 1/02* (2013.01); *F16L 15/00* (2013.01)

(58) Field of Classification Search
CPC ................................ F16L 15/00; F16L 15/006
(Continued)

(56) References Cited

U.S. PATENT DOCUMENTS

| 201,082 | A | * | 3/1878 | Alexander | ............... B25G 1/00 279/99 |
| 1,394,791 | A | * | 10/1921 | Runyan | ................ E21B 17/042 285/115 |

(Continued)

FOREIGN PATENT DOCUMENTS

| CN | 1662726 A | 8/2005 |
| RU | 2398091 C2 | 8/2010 |

(Continued)

OTHER PUBLICATIONS

B. Lundberg. "Efficiency of percussive drilling with extension rods", International Journal of Rock Mechanics and Mining Sciences & Geomechanics Abstracts, vol. 24, No. 4, Aug. 1, 1987, pp. 213-222.
(Continued)

*Primary Examiner* — Anna M Momper
*Assistant Examiner* — Fannie C Kee
(74) *Attorney, Agent, or Firm* — Corinne R. Gorski

(57) ABSTRACT

A drill string and a threaded coupling region for a drill string include threaded male and female ends that are optimized to maximize energy transmission efficiency for percussion drilling. The coupling includes a male spigot to be received within a female sleeve, such that an axial length of the overlap of the spigot within the sleeve is less than an outside diameter of the sleeve.

11 Claims, 4 Drawing Sheets

(58) Field of Classification Search
USPC .................. 285/333–334, 355, 390–391, 913
See application file for complete search history.

(56) References Cited

U.S. PATENT DOCUMENTS

| | | | | |
|---|---|---|---|---|
| 1,515,617 | A | * | 11/1924 | Reynolds ............... E21B 17/042 138/37 |
| 1,589,781 | A | * | 6/1926 | Anderson ............. E21B 17/046 285/330 |
| 1,637,628 | A | * | 8/1927 | Weisgerber ........... E21B 17/042 285/119 |
| 1,714,818 | A | * | 5/1929 | Reed ..................... E21B 17/043 285/333 |
| 1,918,443 | A | * | 7/1933 | Baash ................... E21B 17/042 277/625 |
| 2,205,697 | A | * | 6/1940 | Scharpenberg ....... E21B 17/042 175/320 |
| 3,067,593 | A | * | 12/1962 | McCool ................ E21B 17/042 285/333 |
| 3,080,179 | A | * | 3/1963 | Huntsinger ............. E21B 17/00 138/155 |
| 3,401,371 | A | * | 9/1968 | Hammond ............ H01Q 1/088 174/84 S |
| 3,537,738 | A | | 11/1970 | Fischer et al. |
| 3,773,359 | A | * | 11/1973 | Chance ................... E21B 17/16 175/325.1 |
| 4,506,432 | A | * | 3/1985 | Smith ..................... B23P 11/00 285/329 |
| 4,509,777 | A | * | 4/1985 | Walker ................. E21B 17/042 285/114 |
| 4,998,831 | A | * | 3/1991 | Proni ..................... F16L 19/12 285/322 |
| 5,785,357 | A | * | 7/1998 | Foster ................... F16L 15/08 285/322 |
| 6,108,268 | A | | 8/2000 | Moss |
| 6,164,392 | A | | 12/2000 | Larsson et al. |
| 6,212,763 | B1 | | 4/2001 | Newman |
| 6,485,061 | B1 | | 11/2002 | Mosing |
| 6,581,980 | B1 | * | 6/2003 | DeLange ............... E21B 17/042 285/333 |
| 7,334,821 | B2 | * | 2/2008 | Dutilleul ............... E21B 17/042 285/333 |
| 7,661,727 | B2 | * | 2/2010 | Roussie .................. F16L 15/00 285/333 |
| 2004/0050592 | A1 | | 3/2004 | Carlstrom et al. |
| 2005/0217901 | A1 | | 10/2005 | Hedlund et al. |
| 2006/0032629 | A1 | | 2/2006 | Casper et al. |
| 2010/0308577 | A1 | * | 12/2010 | Chin ..................... E21B 17/042 285/333 |
| 2013/0140813 | A1 | * | 6/2013 | Pallini, Jr. ............. E21B 17/043 285/323 |

FOREIGN PATENT DOCUMENTS

SU 574786 A1 6/1990
WO WO200165058 A1 9/2001

OTHER PUBLICATIONS

E.Beccu et al., "Efficiency of percussive drilling of rock with dissipative joints", Internatinal Journal of Impact Engineering, vol. 9, No. 3, Jan. 1, 1990k, pp. 277-287.

Anonymous. "Drill Rod & Casing Dimensions", Dec. 1, 2012, p. 1-1: URL: http://www.mobiledrill.net/page/drill-rod-and-casing-dimensions.

"Tool Joint Dimensional Data", Dec. 1, 2003, pp. 1-3; :"Rotary Shoulder Handbook", Nov. 1, 2011, pp. 1-116: URL: http//www.nov.com/uploadedFiles/Business_Groups/Grant_Prideco/Drilling_Tubulars/Catalog/D392002466-MKT-001Rev 02 Rotary Shoulder Handbook RS.pdf.

* cited by examiner

ENERGY TRANSMISSION EFFICIENT DRILL STRING COUPLING

RELATED APPLICATION DATA

This application is a § 371 National Stage Application of PCT International Application No. PCT/EP2014/067979 filed Aug. 25, 2014 claiming priority of EP Application No. 13183533.2, filed Sep. 9, 2013.

FIELD OF INVENTION

The present invention relates to a drill string coupling for connecting individual elongate drill string members and in particular, although not exclusively, to an energy transmission efficient coupling that minimises impedance mismatch between the coupled members.

BACKGROUND ART

Percussive drilling is an established technique designed to break rock by impact forces transferred from the drill string to the drill bit at the bottom of a borehole. Typically, the energy required to break the rock is generated by a pneumatic or hydraulic actuated hammer mounted at a ground level end of the string. In particular, a pressured piston is driven forward to contact a shank adaptor at the end of the string such that kinetic energy of the piston is translated to a stress (or shock) wave that travels through the drill string to the drill bit mounted at the furthest end of the string. To maximise energy transfer efficiency, energy loss due to reflections between the coupled drill string members should be minimised.

In particular, it is well established that impedance mismatch in a percussive drill system will reduce the transmitted energy due specifically to reflections that occur at each threaded coupling. For example, a typical energy wave loses an appreciable percentage of its energy each time it passes through a coupling. This loss is due partly to the difference in cross sectional area between the threaded male and female connectors and partly to the imperfect contact between the rod ends. Efficiency of the percussive drilling of rock with regard to the drill rod joints is discussed by: B. Lundberg: "Efficiency of percussive drilling with extension rods", International Journal of Rock Mechanics and Mining Sciences & Geomechanics Abstracts, Vol. 24, no. 4, 1 Aug. 1987, pages 213-222, ISSN: 0148-9062, DOI: 10.1016/0148-9062(87)90176-8; and also by E. Beccu ET AL: "Efficiency of percussive drilling of rock with dissipative joints", International Journal of Impact Engineering, vol, 9 no. 3, 1 Jan. 1990, pages 277-287, ISSN: 0734-743X, DOI: 10.1016/0734-743X(90)90003-E. Example drill string systems having threaded end connections are described in U.S. Pat. No. 6,485,061 and U.S. 2006/0032629.

Non percussive drill systems also utilise rods having threaded ends with example rods described in: Anonymous: "Drill Rod & Casing Dimensions", 1 Dec. 2012, pages 1-1: http://www.mobiledrill.net/page/drill-rod-and-casing-dimensions; "Tool Joint Dimensional Data", 1 Dec. 2003, pages 1-3: "ROTARY SHOULDER HANDBOOK", 1 Nov. 2011, pages 1-116: http//www.nov.com/uploadedFiles/Business_Groups/Grant_Prideco/Drilling_Tubulars/Catalog/D392002466-MKT-001 Rev 02 Rotary Shoulder Handbook RS.pdf.

To optimise drilling performance, drilling parameters associated with percussion pressure, feed force and rotation are specifically selected by an operator. However, the maximum efficiency is limited by the impedance mismatch of the couplings. Moreover, the maximum shock wave amplitude is restricted by the configuration of the male connector. There is therefore a need to improve the energy transmission between the coupling regions of a drill string system.

SUMMARY OF THE INVENTION

It is an objective of the present invention to maximise the energy transmission through a male and female threaded coupling of a drill string to maximise drilling efficiency. It is a further objective to minimise impedance mismatch whilst providing a drill string member that is compatible with existing drill apparatus and methods such that the present invention is suitable for use with existing machinery and procedures. It is a further objective to maximise the achievable shock wave amplitude without damaging the coupling region of the drill string through which the energy wave is transmitted.

The objectives are achieved by providing a drill string and in particular a threaded coupling for connecting drill string members in which male and female coupling parts are adapted specifically to maximise energy transmission in the longitudinal axis direction of the drill string.

According to a first aspect of the present invention there is provided a drill string for percussive drilling comprising: a first elongate drill string member having a main section and a male end; a second elongate drill string member having a main section and a female end; an outside diameter of the female end being greater than an outside diameter of the main section and an outside diameter of the male end comprises an outside diameter that is approximately equal to an outside diameter of the main section; the male and female ends having respective threads to enable the male end to be secured inside the female end such that an axial length of the male and female ends overlap axially; characterised in that: an axial length of the overlap is less than an outside diameter of the female end.

By minimising the length of the male connector part of the coupling (that is responsible for impedance mismatch) the impedance mismatch is reduced accordingly. The relationship between the outside diameter of the female end and the axial length of the male end has been found to influence significantly the energy transmission efficiency of the coupling.

Moreover, shortening the male coupling part also reduces internally generated stresses in the coupling. In particular, an incoming compressive stress wave generates tensile stress in the male end as the stress wave reaches the 'free' end face of the male connector. Effectively the male end is forced to elongate axially forward since there is no 'stop' at the free end. This creates tensile stress at the junction between the drill rod main length and the male connector. The amplitude of this tensile stress is dependent on the length, and in particular, the mass of the male end (the longer/heavier the male end, the higher the tensile stress). If unregulated, this tensile stress causes breakage at the drill rod main length-male end junction and effectively limits the maximum impact amplitude. The present configuration, having a relatively 'shorter' male part is configured to minimise tensile stresses, increase the lifetime of the drill rod and enable 'higher' impact amplitudes (that are desired for maximum rock breaking performance at the borehole bottom).

Within the specification, reference to 'threads' refers to a helical ridge and groove extending axially along a length portion of the male and female end. This term encompasses a thread having a single axially extending helical ridge and a plurality of helical ridges having a plurality of entries on the thread.

Optionally, the helical threads at the male and/or female ends comprise between two to four complete helical turns. This configuration allows the drill string members to be coupled together conveniently and to avoid any axial slippage or decoupling due to undesirable rotation about a longitudinal axis extending through the drill string members.

Optionally, the male end comprises an axial length of between 100 to 150 mm. The axial length of the male end is defined as the axial distance between the endmost part of the drill string member (at the male end) and the region where the main section (or a radially extending shoulder that projects from the main section) decreases representing a transition region between the main section and the male end. Optionally, the male end axial length is in a range 110 to 140 mm or 120 to 130 mm.

Optionally, a wall thickness of the female end is greater than a wall thickness of the male end at the overlap. This configuration is advantageous to provide sufficient strength at the region of the coupling overlap to withstand the stresses resultant from the shock wave and bending movements that occur along the length of the drill string in use.

Preferably, a radial position of the peak of each respective thread turn (at a different axial position along the length of the thread) of the male and female ends is substantially uniform, such that an alignment of or a bisecting line through each peak is substantially parallel to a longitudinal axis of the first and second members. Accordingly, an alignment of the overlap is substantially parallel to the longitudinal axis. Such an arrangement is beneficial to reduce the impedance mismatch and provide efficient transfer of the shock wave through the coupling region.

Preferably, the male end is hollow and an inside diameter of the male end is equal to an inside diameter of the main length section. The respective size of the inside diameters is configured to avoid restriction of a flow of flushing fluids through the drill string.

Preferably, an inside diameter of the main section increases at the junction with the female end. The enlarge diameter coupling region is advantageous to provide bending stiffness of the string to withstand large bending moments and non-symmetrical forces acting on the string. Again, such configuration provides a desired stiffness of the coupling region without compromising the efficient transfer of the shock wave between the coupled drill string members.

Optionally, the present drill string and threaded coupling arrangement is suitable for both 'shoulder contact' and 'bottom contact' coupling configurations. As will be appreciated, the term 'shoulder contact' refers to a configuration in which the threaded male end is terminated at its axially innermost region by a radially projecting shoulder that is configured to abut against an axially endmost region of the female end of a neighbouring drill string member. The term 'bottom contact' refers to a coupling in which the endmost region of the male end abuts against an axially innermost internal end of the female sleeve.

Optionally, the drill rod may comprise a shoulder projecting radially from one end of the main section at the region of the male end wherein an outside diameter of the shoulder is greater than an outside diameter of the main section.

Optionally, the male end comprises a non-threaded shank positioned axially intermediate the main section and a region of the male end comprising the threads.

Optionally, an axial length of the non-threaded shank is substantially equal to an axial length over which the threads extend along the male end.

According to a second aspect of the present invention there is provided a threaded coupling for connecting drill string members to form a drill string for percussive drilling, the coupling comprising: a male end having an axial length and an outside diameter; a hollow female end having an axial length and an outside diameter, the outside diameter of the female end being greater than the outside diameter of the male end; the male and female ends having respective threads to enable the male end to be secured inside the female end such that at least a part of the axial length of the male and female ends overlap axially to form a coupling; the outside diameter of the female end being greater than an outside diameter of the main section and an outside diameter of the male end comprises an outside diameter that is approximately equal to an outside diameter of the main section; characterised in that: an axial length of the overlap is less than the outside diameter of the female end.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

As will be appreciated a stress or shock wave that is transmitted through a drill string from the initial impact piston comprises a generally rectangular shape profile having a wavelength that is approximately twice the length of the piston and a wave amplitude that depends on the speed of the piston on impact and the relationship between the cross sectional area of the piston and the drill rod. Typically, the shock wave loses a significant percentage of its energy as it is transmitted through the coupling region of the drill string. Additionally, it is well established that differences in the cross sectional area between the male and female threaded couplings contribute to the impedance mismatch in the drill system.

However, the subject invention provides an energy transmission efficient coupling that minimises the length of the impedance mismatch by minimising an axial length of the overlap region between the threaded male and female coupling ends of the drill string rods.

Figure 1:
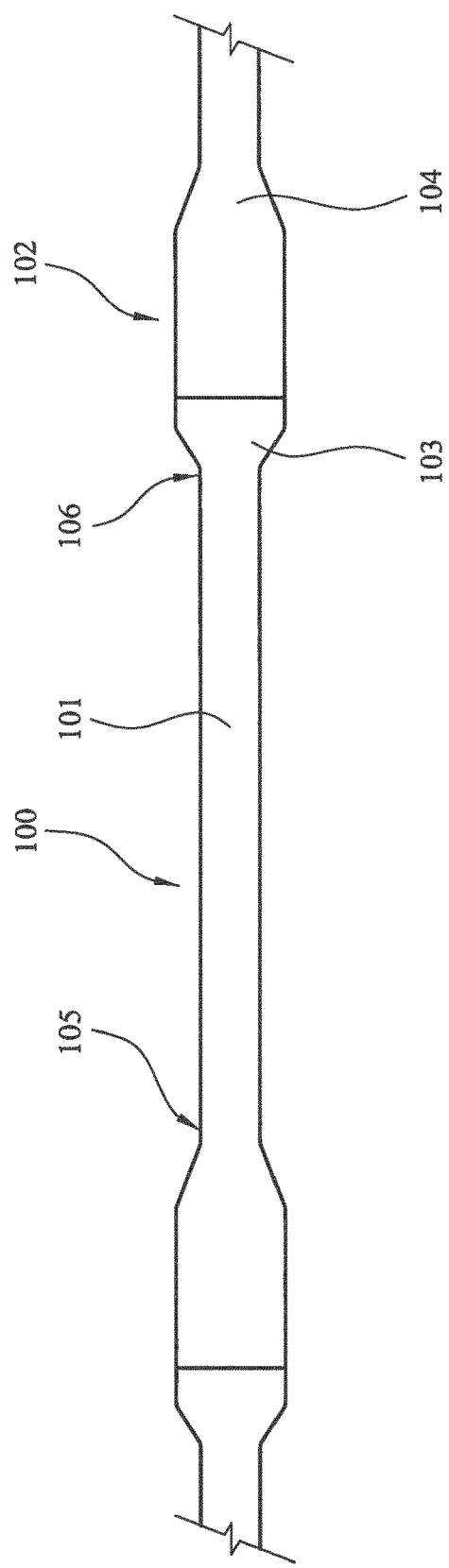
FIG. 1 is an external view of a drill string formed from a plurality of elongate drill rods connected end-to-end by cooperated male and female threaded couplings according to a specific implementation of the present invention.

Referring to FIG. 1, a drill string comprises a plurality of interconnected drill string rods 100. Each rod 100 comprises a main length section 101 having a first end 105 and a second end 106. An outside diameter of the main length section 101 increases at each end 105, 106 to form a radially flared end coupling region 103, 104 respectively. A part of each coupling end 103, 104 comprises a threaded portion to allow the ends 103, 104 to engage one another and form a secure threaded coupling 102 to interconnect a plurality of rods 100 to form the drill string.

Figure 2:
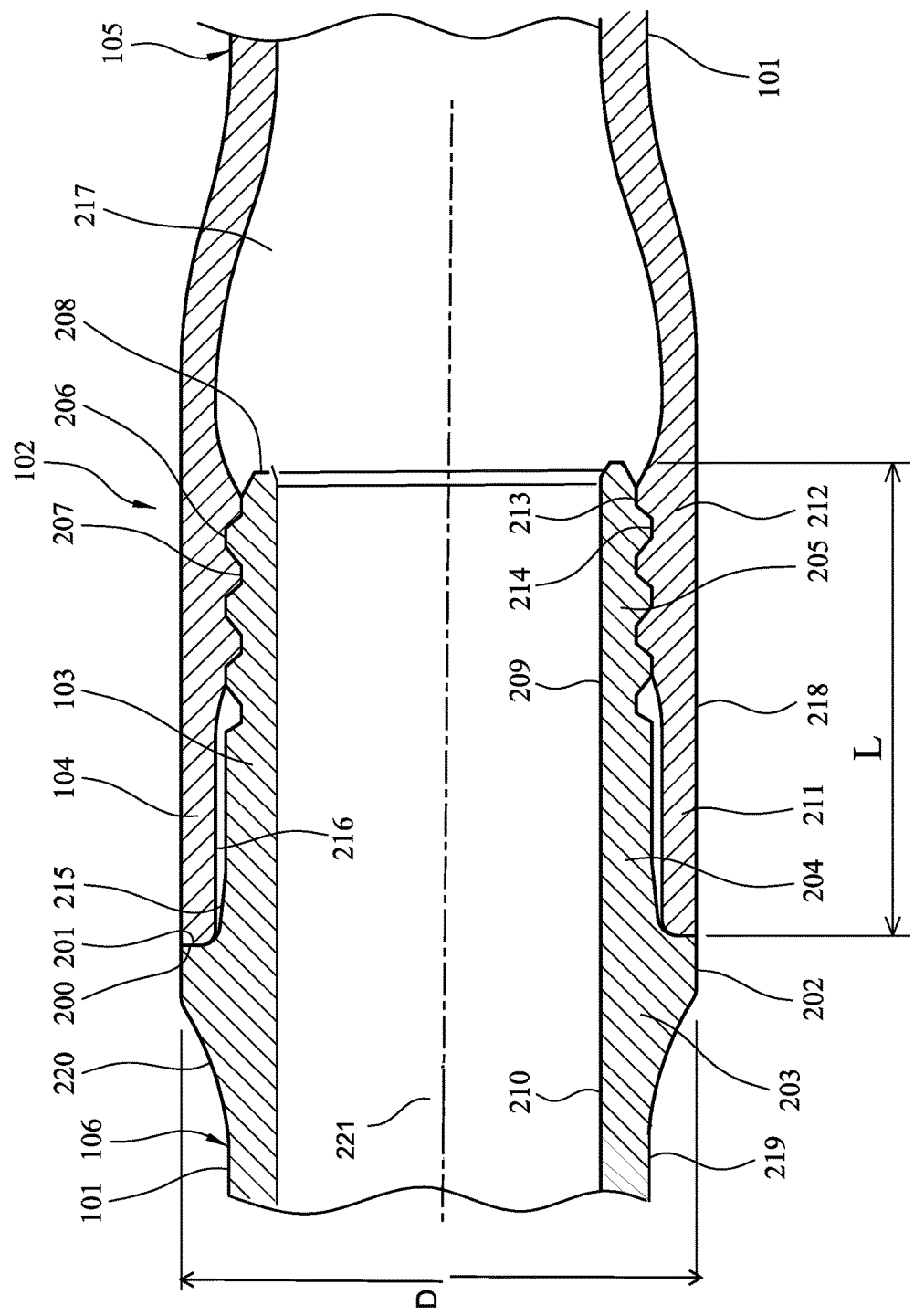
FIG. 2 is a cross section through the male and female coupling of the drill string of FIG. 1.

FIG. 2 illustrates the coupling region 102 of FIG. 1 in more detail. In particular, male end 103 projects axially from main section end 106. An annular shoulder 203 projects radially from end 106 such that a diameter of an outer surface 202 of shoulder 203 is greater than a diameter of main section 101 at external surface 219. The radially outermost region of shoulder 203 is bordered at a first side by a concave tapered surface 220 and at a second side by an annular abutment surface 201 aligned perpendicular to a longitudinal axis 221 extending through the rods 100. Male end 103 comprises a shank 204 aligned substantially parallel with axis 221 and having an outer surface 215 aligned substantially parallel to axis 221. Shank 204 is terminated at its endmost region by a threaded section indicated generally by reference 205. In particular, section 205 corresponds approximately in shape and configuration to shank 204 but comprises external facing threads extending axially between an annular end surface 208 (of male coupling 103) and shank 204. According to the specific implementation, the thread is formed from two helices having 1.5 helical turns between shank 204 and end surface 208. An external shape profile of threaded section 205 therefore comprises a series of ridges 206 and troughs 207 when the male end is viewed externally from one side for example. According to the specific implementation, the outside diameter of the threaded section 205, corresponding to an axial and radial position of the peak of each ridge 206 is approximately equal to an outside diameter of main length section 101. Additionally, an outside diameter of shank surface 215 is approximately equal to the outside diameter of the axial and radial position corresponding to each ridge 206. Male end 103 is hollow so as to comprise an internal surface 209 that is aligned parallel or coaxially with an internal surface 210 of main length section 101.

Female end 104 comprises a generally hollow sleeve-like configuration that is generally flared radially outward relative to main length section 101 and is coupled to section 101 via a radially tapered region 217. Sleeve 104 comprises an external surface 218 and a corresponding internal surface 216. An axially endmost region 211 of sleeve 104 comprises internal surface 216 aligned substantially parallel with axis 221. A threaded region 212 is positioned axially between endmost region 211 and flared region 217 and comprises threads formed at internal surface 216. To correspond to the threads of the male end 103, the threads of the female end 104 also comprise 1.5 complete helical turns to define a helically extending ridge 213 and trough 214, with ridge 213 projecting radially inward towards the trough 207 of male end 103.

Male end 103 is fully engaged within the sleeve-like configuration of the female end 104 when an endmost annular surface 200 of end region 211 abuts against the annular abutment surface 201 at the side of shoulder 203. The present implementation is therefore described by way of example with reference to a 'shoulder contact' configuration. However, and as will be appreciated, the present invention may be equally implemented in a 'bottom contact' configuration in which male end surface 208 would abut against a cooperating abutment surface provided at a part of flared region 217. As indicated, the subject invention comprises a coupling region 102 that is optimised to minimise the length of any impedance mismatch between the coupled rods 100. That is, a length L that represents the axial length of the overlap between the male end 103 and the female end 104 is maintained to a minimum without compromising coupling strength and the ability of the drill string to withstand stresses and stress concentrations within the coupling region 102 resulting from tensile and bending forces. In particular, male and female ends 103, 104 are optimised such that the axial length L, corresponding to the axial distance between male end surface 208 and female end surface 200, is less than an outside diameter D of the female sleeve 104 corresponding to outer surface 218. Additionally, an axial length of the male spigot portion comprising a combined axial length of the shank 204 and threaded section 205 is less than outside diameter D of the sleeve 104. Such a configuration minimises the mass of male end 103 and accordingly the tensile stress created at the junction between end 103 and shoulder 203 which would otherwise lead to breakage of the shank 204 away from the abutment surface 201. The present coupling is therefore configured to withstand significantly higher incident compressive shock waves resultant from higher impact amplitudes.

According to further specific implementations, each of the threaded sections 205, 212 may include a single helix having between two to four complete helical turns extending along the full axial length of threaded sections 205, 212.

To illustrate the effectiveness of the subject invention to minimise impedance mismatch and accordingly reduce any transmission inefficiency through the multiple coupling regions 102, a comparison was undertaken between a coupling 102 of the subject invention and a conventional coupling in which the overlap distance L was greater. In particular, and according to the specific implementation, both sets of rods comprised a total rod length of 3 m having a main length section 101 with an outside diameter of 110 mm and an inner diameter of 80 mm. The outside diameter D of each female coupling 104 was 140 mm. The axial length of the male spigot 103 (including shank 204 and threaded section 205) was 125 mm. A corresponding axial length of a conventional test male spigot was 190 mm corresponding to distance L of FIG. 2. Accordingly, the 'overlap' region of the two rod types is represented by distance L of FIG. 2.

Figure 3:
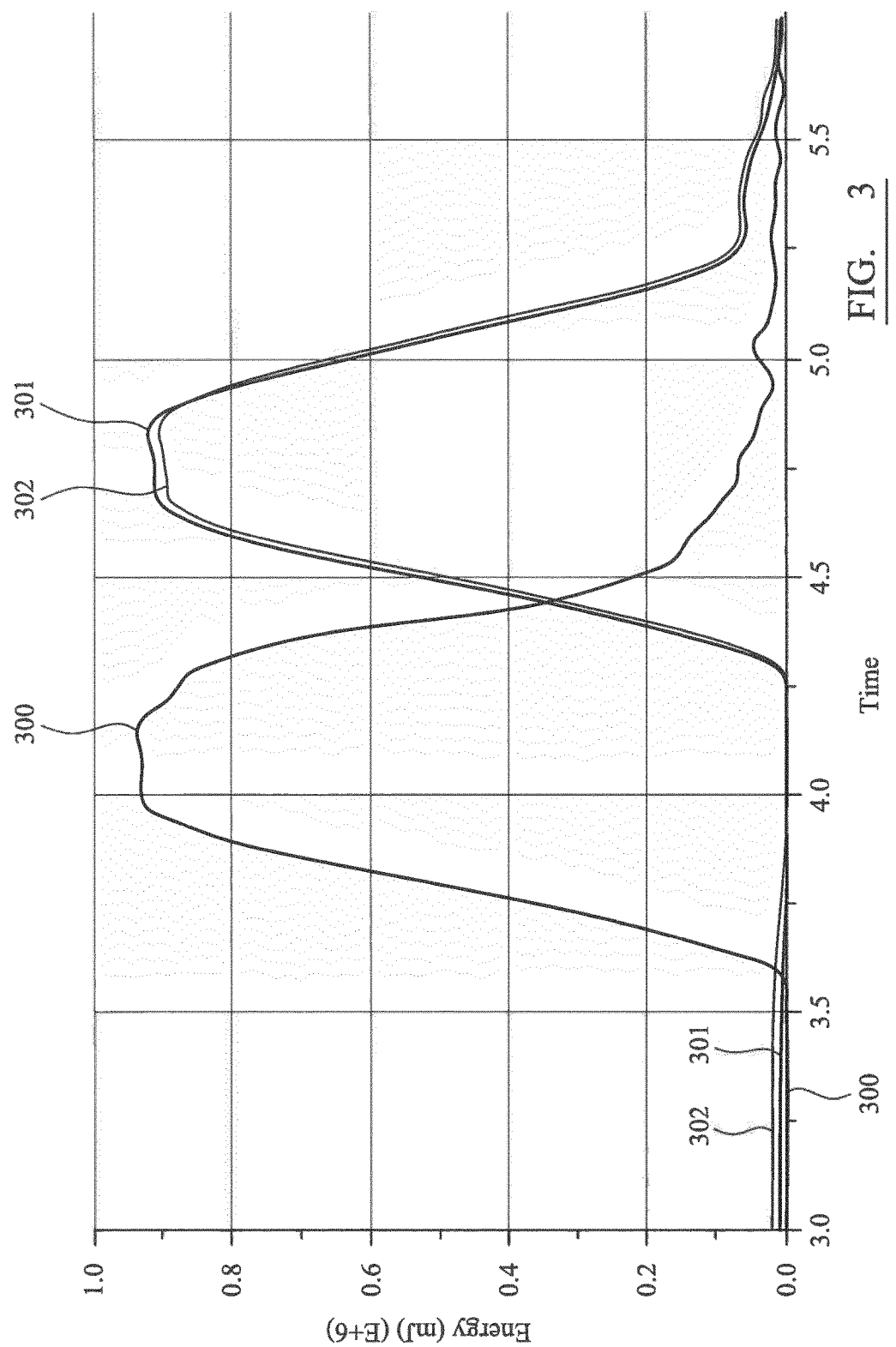
FIG. 3 is a graph of the energy of an incident shock wave at the coupling and the energy transmitted through the coupling to illustrate the transmission efficiency of the present invention compared with a drill string having conventional threaded couplings.
Figure 4:
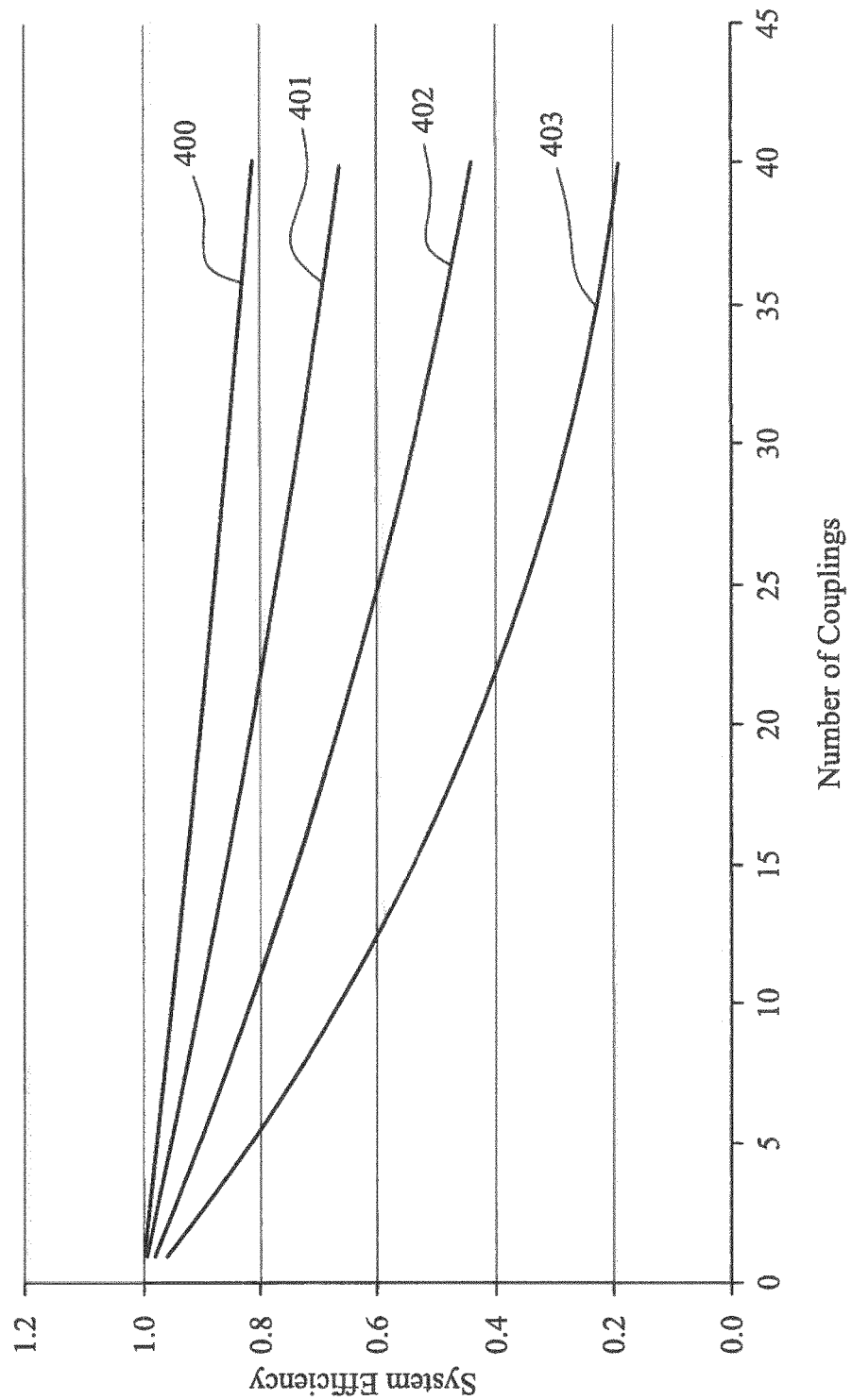
FIG. 4 is a graph of energy transmission efficiency through a drill string having different coupling configurations.

A simulation of the energy transmission was then undertaken using LS-DYNA mpp R6.1.1 rev. 78769 in single precision and compiled for Linux CentOS 5.3.1. The calculations were undertaken by employing 12 Xenon64 CPUs. An inbuilt functionality was used to calculate the elastic and kinetic energies. These energies were then summed to obtain the total energy of the shock wave generated by the initial piston strike at the region within the main length section 101, representing incoming energy together with the transmitted energy through the drill string after passing through a single coupling region 102. The results of the simulation are illustrated in FIG. 3 where 300 corresponds to the incoming energy through section 101. The energy transmission profile for the subject invention is shown as 301 and the energy transmission efficiency of the conventional coupling with a longer overlap region L is shown as 302. As will be noted, the energy efficiency of the conventional coupling is approximately 96%. In contrast, the energy transmission efficiency of the subject invention is 98%. FIG. 4 illustrates the cumulative effect of sequential coupling regions 102 on the total energy transmission efficiency. In particular, FIG. 4 illustrates the system efficiency for four different coupling configurations in which distance L is variable corresponding to a system with 99.5% efficiency 400; 99% efficiency 401; 98% efficiency 402 (the subject invention) and 96% efficiency 403 (of the simulated prior art coupling detailed above). As will be appreciated, progression through forty couplings provides an energy efficiency transmission increase of nearly 30%.

The invention claimed is:

1. A drill string for percussive drilling comprising:
a first elongate drill string member having a main section and a male end;
a second elongate drill string member having a main section and a female end;
an outside diameter of the female end being greater than an outside diameter of the main section of the second drill member and an outside diameter of the male end being approximately equal to an outside diameter of the main section of the first drill string member; and
the male and female ends having respective threads to enable the male end to be secured inside the female end such that the male and female ends overlap axially by an axial length, the axial length of overlap of the male and female ends defining a coupling region, wherein the axial length of the coupling region is less than the outside diameter of the female end, the male end including a non-threaded shank positioned within the coupling region axially intermediate the main section, wherein a region at the male end includes the threads and an axial length of the non-threaded shank is substantially equal to an axial length of the region over which the threads extend along the male end, a combined axial length of the threaded region and the non-threaded shank of the male end being less than the outside diameter of the female end.

2. The drill string as claimed in claim 1, wherein the respective threads are helical threads and the male and female ends include between two to four complete helical thread turns.

3. The drill string as claimed in claim 1, wherein the combined axial length of the male end is between 100 to 150 mm.

4. The drill string as claimed in claim 1, wherein a wall thickness of the female end is greater than a wall thickness of the male end at the overlap.

5. The drill string as claimed in claim 1, wherein a longitudinal alignment of the respective threads of the male and female ends is substantially parallel to a longitudinal axis of the first and second members such that the alignment of the overlap is substantially parallel to the longitudinal axis.

6. The drill string as claimed in claim 1, wherein the male end is hollow and an inside diameter of the male end is equal to an inside diameter of the main section of the first drill member.

7. The drill string as claimed in claim 1, wherein an inside diameter of the main section of the second drill member increases at the junction with the female end.

8. The drill string as claimed in claim 1, further comprising a shoulder projecting radially from one end of the main section at the region of the male end, wherein an outside diameter of the shoulder is greater than an outside diameter of the main section thereof.

9. The drill string as claimed in claim 1, wherein the threaded region corresponds approximately in shape and configuration to the non-threaded shank, the thread of the male end being an external facing thread extending axially between an annular end surface of the male end and the non-threaded shank.

10. A threaded coupling for connecting drill string members to form a drill string for percussive drilling, the coupling comprising:
a male end of a first drill string, the male end having an axial length and an outside diameter; and
a hollow female end of a second drill string, the female end having an axial length and an outside diameter, the outside diameter of the female end being greater than the outside diameter of the male end, the male and female ends having respective threads to enable the male end to be secured inside the female end such that at least a part of the axial length of the male and female ends overlap axially by an axial length, the axial length of overlap of the male and female ends defining a coupling region, the outside diameter of the female end being greater than an outside diameter of a main section of the second drill string and an outside diameter of the male end having an outside diameter that is approximately equal to an outside diameter of a main section of the first drill string, wherein the axial length of the coupling region is less than the outside diameter of the female end, the male end including a non-threaded shank positioned within the coupling region axially intermediate the main section, and wherein a region at the male end includes the threads and an axial length of the non-threaded shank is substantially equal to an axial length of the region over which the threads extend along the male end, a combined axial length of the threaded region and the non-threaded shank of the male end being less than the outside diameter of the female end.

11. The drill string as claimed in claim 10, wherein the threaded region corresponds approximately in shape and configuration to the non-threaded shank, the thread of the male end being an external facing thread extending axially between an annular end surface of the male end and the non-threaded shank.

* * * * *